UNITED STATES PATENT OFFICE.

ROBERT W. CORNELISON, OF BLOOMFIELD, NEW JERSEY, AND WILLIAM H. WARREN, OF BROOKLYN, NEW YORK.

PROCESS OF OBTAINING ACETO DERIVATIVES OF AROMATIC AMINS.

SPECIFICATION forming part of Letters Patent No. 574,395, dated January 5, 1897.

Application filed May 25, 1896. Serial No. 593,043. (No specimens.)

*To all whom it may concern:*

Be it known that we, ROBERT W. CORNELISON, of Bloomfield, Essex county, New Jersey, and WILLIAM H. WARREN, of Brooklyn, Kings county, New York, citizens of the United States, have invented a new and useful Process for the Manufacture of the Aceto Derivatives of the Aromatic Amins, of which the following is a full, clear, and exact description, and such as will enable others skilled in the art to which it appertains to use the same.

The term "aceto derivatives of the aromatic amins" is used to designate the class of crystalline compounds which are formed by the union of acetic acid with the amido derivatives of the members of the various groups of the aromatic hydrocarbon series, (including benzin and its homologues, represented by the formula $C_nH2_n-6$, cinnamene, naphthalene, &c., containing a proportionally-smaller number of hydrogen atoms, and the terpenes containing a proportionally-larger number of hydrogen atoms,) the acetic acid radical replacing an atom of hydrogen in the amido radical of the amins. Of the compounds of this class acetanilid, $(C_6H_5.NH.C_2H_3O,)$ also known as "phenylacetamid," the acetotoluids, $(C_6H_4.CH_3.NH.C_2H_3O,)$ the acetxylids, $(C_6H_3.CH_3.CH_3.NH.C_2H_3O,)$ and acetnaphthalid, $(C_{10}H_7.NH.C_2H_3O,)$ are among the best known commercially. Heretofore these compounds have been made by heating strong concentrated acetic acid and the desired aromatic amin, or by the reaction of acetic anhydrid or acetyl chlorid with the amin. These methods of manufacture, however, are expensive, because the concentrated acetic acid, the acetic anhydrid, and the acetyl chlorid are all difficult to obtain and therefore expensive as compared with the common acetic-acid salts. We have discovered that the various compounds of this class can be made directly from the common acetic-acid salts, thereby doing away with all the trouble and expense of the manufacture and concentration of the acetic acid, acetic anhydrid, or acetyl chlorid heretofore used, and so enabling us to produce them in a much cheaper manner than that in which they have been produced up to the present time.

Our newly-discovered process of manufacture consists in replacing the acetic-acid radical of an acetic-acid salt with another acid radical and causing the acetic-acid radical thus liberated to unite with the desired aromatic amin to form the aceto derivative thereof.

One specific method of carrying our invention into effect, and the one which we consider as perhaps the most satisfactory, is as follows: We bring together an acetic-acid salt (preferably the sodium or potassium salt) and a salt of the required amin, (the hydrochlorid or sulfate being preferred.) They readily react upon each other, especially on the application of heat, the acid or negative radical of the amin salt breaking up the acetic-acid salt and uniting with its basic radical, liberating at the same time the amin and acetic acid, (and by the term "acetic acid," as hereinafter used, we mean the free acid or the nascent-acid radical, whichever form the said acid may take,) and these unite somewhat less readily, and preferably under the continued application of heat, to form the aceto derivative of the amin and water. It is probable that the acetic acid and the amin, when first liberated, unite to some extent at least to form the acetate of the amin; but, be this as it may, whatever the intermediate reactions and products, whether the two exist first in mixture or are chemically united to a greater or less extent, the aceto derivative and water are obtained as the final products. This latter reaction may be carried out in the presence of the salt formed by the acid radical of the amin salt and the basic radical of the acetic-acid salt in the first reaction, or this newly-formed salt may first be removed by filtration or other suitable method.

It is important that all the materials used should be as free from water as possible, as the results will be most satisfactory if the reactions take place in the presence of a minimum quantity of water. It is best, therefore, to dehydrate the salts, and this can easily be done by thoroughly drying them—a very simple matter.

The relative proportions of the two salts used are of course governed by their molecular weights, and will vary as either the amin salt or the acetic-acid salt used as a reagent therewith is changed. It is sometimes desirable, however, to have a slight excess of the acetic-acid salt or of acetic acid, in which case some free acetic acid may be added or a larger proportion of the salt may be used, either with or without the addition of an acid, such, for example, as sulfuric acid, to liberate the additional acetic acid required.

Taking anilin as a simple type of the aromatic amins and by way of illustration, in practicing our invention commercially we first dry the salts and mix them together in a suitable vessel, preferably an earthenware vessel with a reflex condenser or similar contrivance attached thereto. A good relative proportion of the dehydrated salts, if anilin hydrochlorid and the acetate of sodium are used, is one hundred and twenty-nine parts by weight of the former to eighty-two to eighty-four parts by weight of the latter. The mixture is then heated to a temperature in the neighborhood of 125° centigrade, (although the degree of heat required to produce the best results varies considerably, according to circumstances,) and it is best to further hasten the first reaction by stirring, and under these conditions it will take place in a very short time. The mixture is then kept at practically the same temperature for a period of some hours, (say from twelve to twenty-four, although the length of time required to produce the best results also varies largely, according to circumstances, and especially the degree of heat employed,) at the end of which it will be found that the acetic acid and the anilin, liberated by the first reaction and left in mixture or to some extent chemically combined, have for the greater part been converted into acetanilid. The acetanilid is thereupon separated out or recovered by pouring the mixture in its melted condition, or, perhaps better, after it has been allowed to solidify by cooling, into a vessel of cold water sufficient in quantity to dissolve the various products or ingredients present which have not been converted into acetanilid, (including the salt formed by the base of the acetic-acid salt and the acid radical of the anilin salt by the first reaction, if this salt had not previously been removed,) the acetanilid being deposited, on cooling, in crystals, which can be removed and purified in the usual way, or it may be more convenient to add to the mixture some solvent of acetanilid, such as wood-spirit or methyl alcohol or benzin, which will dissolve out the acetanilid and leave the other ingredients, and then recover the acetanilid by distillation. In all cases it is desirable to recover the acetic acid and the anilin that were not converted into acetanilid by some convenient method, such, for example, as distillation.

As above indicated, the length of time required for the operation depends very largely upon the amount of heat employed. The reactions will take place slowly and more or less completely under ordinary temperatures; but they are greatly promoted, especially the final union of the acetic acid and the amin liberated by the first reaction, and a maximum yield of the aceto derivative is obtained by a certain degree of additional heat. In commercial operations a heat of about 125° centigrade, as specified above, is the most satisfactory, for, while a materially lower degree of heat will retard the reactions and yield a smaller amount of the final product, a materially higher degree of heat is objectionable, because it necessitates doing the work under pressure and in vessels which are capable of withstanding the pressure thus created and also the corroding effects of the acetic acid, so as not to be a source of danger, without increasing the amount of the aceto derivative obtained.

It is to be understood that in practicing our invention we do not limit ourselves to the use of the specific salts named or to any particular salts of acetic acid and the aromatic amins; nor do we limit ourselves to the use, in the first instance, of an amin salt at all, as the same end may be attained by starting with the amin itself and forming, as a part of the process, the amin salt, which is to be used with the acetic-acid salt, as above described, in any way or by mixing the simple amin with other materials capable of yielding acetic acid. Thus, for example, by adding a concentrated acid, such, for instance, as sulfuric acid, to an amin we get the amin salt required for use with the acetic-acid salt, and it is obvious that in whatever order the various materials are brought together, whether the acid is added first to the amin to form the amin salt and the acetic-acid salt is then mixed with the amin salt thus formed or the acid is first added to the acetic-acid salt, or vice versa, (in either of which cases a salt of the acid used is formed and acetic acid liberated,) and the amin is then added or the acid is added to a mixture of the acetic-acid salt and the amin, the final result is one and the same, namely, the production of a mixture containing acetic acid and the amin (together with a salt of the base of the acetic acid originally used, and with, perhaps, other ingredients or impurities) which are converted into the aceto derivative of the amin in the manner above described; or, as a further example, instead of using an acid, as above indicated, we can accomplish the same thing by the use of a salt the basic or positive radical of which is more volatile than the amin, (the sulfate or the chlorid of ammonium, for instance, being examples of salts of this class and the ones we prefer to use,) as the amin will replace this more volatile base under the conditions of heat and dehydration we have pointed out above, thereby forming an amin salt and liberating the volatile base of the salt used; and here, again, it is obvious that the final result will be the same in whatever order the acetic-acid salt, the amin, and the salt with the base more volatile than the amin are brought together, although the intermediate reactions and products will vary; namely, the volatile base will be driven out by the amin and will escape at one stage or another, and the aceto derivative of the amin will be obtained as the final product.

What we claim, broadly, as our invention, and desire to secure by Letters Patent, is—

1. The above-described method of producing the aceto derivatives of the aromatic amins, which consists in making them directly from an acetic-acid salt by replacing the acetic-acid radical of this salt with another acid radical, such as a sulfuric-acid radical, and causing the acetic-acid radical thus liberated to react finally with an aromatic amin to form the aceto derivative thereof.

2. The above-described method of producing acetanilid, which consists in making it directly from an acetic-acid salt by replacing the acetic-acid radical of the salt with another acid radical, such as a sulfuric-acid radical, and causing the acetic-acid radical thus liberated to react finally with anilin to form acetanilid.

3. The process of manufacturing the aceto derivatives of the aromatic amins by the reactions of an acetic-acid salt and an aromatic-amin salt upon each other, substantially as described.

4. The process of manufacturing acetanilid by the reactions of an acetic-acid salt and an anilin salt upon each other, substantially as described.

R. W. CORNELISON.
W. H. WARREN.

Witnesses for Cornelison:
E. ORMANT,
FRANK HILL.

Witnesses for Warren:
FRANK L. FULLAM,
JAMES HUNTER.